(12) United States Patent
Kawase et al.

(10) Patent No.: US 10,355,292 B2
(45) Date of Patent: Jul. 16, 2019

(54) METHOD OF CONTROLLING FUEL CELL SYSTEM BY COMPARING PRESSURES IN FUEL GAS PATH

(71) Applicant: HONDA MOTOR CO., LTD., Tokyo (JP)

(72) Inventors: Satoru Kawase, Wako (JP); Kuniaki Ojima, Wako (JP); Koshi Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

(21) Appl. No.: 15/638,370

(22) Filed: Jun. 30, 2017

(65) Prior Publication Data

US 2018/0034078 A1    Feb. 1, 2018

(30) Foreign Application Priority Data

Jul. 28, 2016    (JP) .................................. 2016-147928

(51) Int. Cl.

| H01M 8/0438 | (2016.01) |
|---|---|
| H01M 8/04014 | (2016.01) |
| H01M 8/04082 | (2016.01) |
| H01M 8/04089 | (2016.01) |
| H01M 8/04119 | (2016.01) |

(Continued)

(52) U.S. Cl.
CPC ....... *H01M 8/04126* (2013.01); *H01M 8/045* (2013.01); *H01M 8/04014* (2013.01); *H01M 8/04089* (2013.01); *H01M 8/0494* (2013.01); *H01M 8/04179* (2013.01); *H01M 8/04201* (2013.01); *H01M 8/04425* (2013.01); *H01M 8/04432* (2013.01); *H01M 8/04619* (2013.01); *H01M 8/04686* (2013.01); *H01M 8/04955* (2013.01); *H01M 2250/20* (2013.01); *Y02T 90/32* (2013.01)

(58) Field of Classification Search
CPC ......... H01M 8/04126; H01M 8/04014; H01M 8/04089; H01M 8/04179; H01M 8/04201; H01M 8/04425; H01M 8/04432; H01M 8/045; H01M 8/04619; H01M 8/04686; H01M 8/0494; H01M 8/04955
USPC .......................... 429/408, 413, 429, 430, 446
See application file for complete search history.

(56) References Cited

U.S. PATENT DOCUMENTS

| 2007/0243426 | A1* | 10/2007 | Bono ................ H01M 8/04089 429/444 |
|---|---|---|---|
| 2014/0176325 | A1* | 6/2014 | Park ...................... B60Q 5/005 340/455 |

FOREIGN PATENT DOCUMENTS

| JP | 2007-134168 | 5/2007 |
|---|---|---|
| JP | 2016-031878 | 3/2016 |

* cited by examiner

*Primary Examiner* — Sean P Cullen
(74) *Attorney, Agent, or Firm* — Mori & Ward, LLP (57) ABSTRACT

A method of controlling a fuel cell system includes supplying a fuel gas from a fuel-gas storage container to a fuel cell via a drive valve provided in a fuel-gas path. A first pressure is detected in the fuel-gas path between a first decompression mechanism and a second decompression mechanism. A second pressure is detected in the fuel-gas path between the second decompression mechanism and the drive valve. An on-off valve is opened. The on-off valve is provided in a bypass path. The first pressure and the second pressure are compared after the on-off valve has been opened. The fuel cell system is controlled to decrease electric power gener- (Continued)

ated by the fuel cell or to stop generating electric power in the fuel cell when the first pressure is not substantially equal to the second pressure.

8 Claims, 4 Drawing Sheets

(51) Int. Cl.
*H01M 8/04492* (2016.01)
*H01M 8/04537* (2016.01)
*H01M 8/04664* (2016.01)
*H01M 8/04828* (2016.01)
*H01M 8/04955* (2016.01)

METHOD OF CONTROLLING FUEL CELL SYSTEM BY COMPARING PRESSURES IN FUEL GAS PATH

CROSS-REFERENCE TO RELATED APPLICATIONS

The present application claims priority under 35 U.S.C. § 119 to Japanese Patent Application No. 2016-147928, filed Jul. 28, 2016, entitled "Method of Controlling Fuel Cell System." The contents of this application are incorporated herein by reference in their entirety.

BACKGROUND

1. Field

The present disclosure relates to a method of controlling a fuel cell system.

2. Description of the Related Art

A fuel cell includes an electrolyte/electrode structure in which an anode electrode and a cathode electrode are respectively disposed on a first surface and a second surface of an electrolyte. An electric-power generation cell (unit cell) is formed by sandwiching an electrolyte/electrode structure between separators. In general, a stack that is obtained by stacking a predetermined number of such electric-power generation cells on top of one another is used. This type of fuel cell is mounted on, for example, a vehicle body of an automobile. In most cases, a solid polymer electrolyte fuel cell whose electrolyte is formed of a polymer ion-exchange membrane is employed for such a vehicle-mounted use.

When operating a fuel cell, a fuel gas (e.g., a hydrogen gas) is supplied to an anode electrode, and an oxidant gas (e.g., an oxygen-containing gas such as compressed air) is supplied to a cathode electrode. Consequently, a fuel-gas supply flow path, an oxidant-gas supply flow path, and the like are formed in the fuel cell. As a result, a fuel cell system is constructed.

The hydrogen gas is stored in a gas tank while in a compressed state, and thus, the hydrogen gas is under high pressure. Accordingly, a decompression system for decompressing the hydrogen gas, which is to be supplied to the anode electrode from the gas tank, is provided in the fuel-gas supply flow path. For example, in the technology described in Japanese Unexamined Patent Application Publication No. 2007-134168, a plurality of decompression valves is provided.

As described in Japanese Unexamined Patent Application Publication No. 2016-31878, it is known that a hydrogen gas, which has been decompressed, is supplied to an anode electrode via an injector, which is disposed downstream from a decompression system. When the pressure on the upstream side of the injector is excessively large, the operating sound of the injector increases. In order to suppress this from occurring, a decompression valve and a bypass valve that is provided in a bypass flow path, which branches off from a fuel-gas supply flow path so as to bypass the decompression valve, is controlled in an appropriate manner in accordance with the operational state of a fuel cell.

SUMMARY

According to one aspect of the present invention, a method of controlling a fuel cell system that includes a fuel cell, includes supplying an oxidant gas to a cathode electrode of the fuel cell. A fuel gas is supplied from a fuel-gas storage container to an anode electrode of the fuel cell via a drive valve provided in a fuel-gas path to generate electric power in the fuel cell via an electrochemical reaction between the fuel gas and the oxidant gas. A first pressure is detected in the fuel-gas path between a first decompression mechanism and a second decompression mechanism. The first decompression mechanism is provided in the fuel-gas path between the drive valve and the fuel-gas storage container. The second decompression mechanism is provided in the fuel-gas path between the first decompression mechanism and the drive valve. A second pressure is detected in the fuel-gas path between the second decompression mechanism and the drive valve. An on-off valve is opened. The on-off valve is provided in a bypass path that bypasses the second decompression mechanism. The first pressure and the second pressure are compared after the on-off valve has been opened. The fuel cell system is controlled to decrease electric power generated by the fuel cell or to stop generating electric power in the fuel cell when the first pressure is not substantially equal to the second pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

A method of controlling a fuel cell system according to the present disclosure will now be described in detail below using preferred embodiments and with reference to the accompanying drawings.

Figure 1:
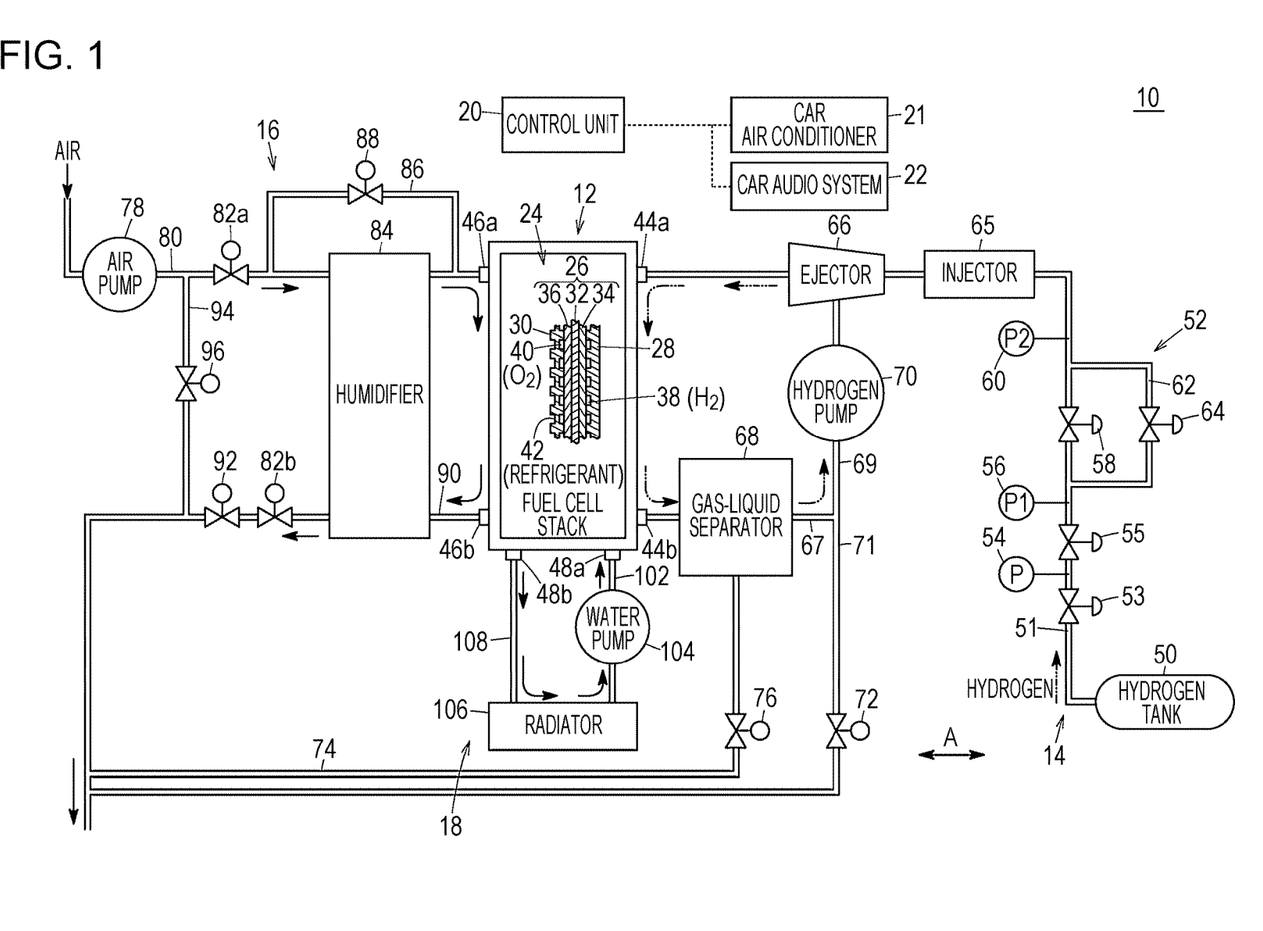
FIG. 1 is a diagram illustrating a schematic configuration of a fuel cell system for which a method of controlling a fuel cell system according to an embodiment of the present disclosure is used.

First, a fuel cell system will now be described with reference to FIG. 1, which is a diagram illustrating a schematic configuration of the fuel cell system. A fuel cell system 10 includes a fuel cell stack 12 (fuel cell) that is mounted on a vehicle body of an automobile (not illustrated). In other words, in this case, the vehicle body of the automobile is a fuel-cell vehicle of a fuel-cell electric automobile or the like.

The fuel cell stack 12 includes a fuel-gas supply device 14 that supplies a fuel gas, an oxidant-gas supply device 16 that supplies an oxidant gas, and a cooling-medium supply device 18 that supplies a cooling medium. In the present embodiment, a hydrogen gas is used as the fuel gas, and compressed air is used as the oxidant gas. The fuel cell system 10 further includes a control unit 20 (e.g., an electronic control unit (ECU)), which is a system control unit.

A car air conditioner 21 (a vehicle air-conditioning mechanism) and a car audio system 22, each of which is a sound generation mechanism, are mounted on the vehicle body of the automobile. An information signal that indicates whether the car air conditioner 21 or the car audio system 22 is in an operating state is transmitted to the control unit 20.

The fuel cell stack 12 includes a plurality of electric-power generation cells 24 stacked on top of one another in the horizontal direction or in the vertical direction. Here, each of the electric-power generation cells 24 is formed by sandwiching an electrolyte membrane/electrode structure 26 between a first separator 28 and a second separator 30. The first separator 28 and the second separator 30 are made of a metal or carbon.

For example, each of the electrolyte membrane/electrode structures 26 includes a solid polymer electrolyte membrane 32, which is a moisture-containing perfluoro sulfonic acid membrane, an anode electrode 34, and a cathode electrode 36. The solid polymer electrolyte membrane 32 is sandwiched between the anode electrode 34 and the cathode electrode 36. As the solid polymer electrolyte membrane 32, a hydrocarbon (HC)-based electrolyte may also be used other than a fluorine-based electrolyte such as that described above.

A hydrogen-gas flow path (fuel-gas flow path) 38 is formed in the first separator 28 so as to be positioned between the first separator 28 and the electrolyte membrane/electrode structure 26 and used for supplying the hydrogen gas to the anode electrode 34. In contrast, an air flow path 40 is formed in the second separator 30 so as to be positioned between the second separator 30 and the electrolyte membrane/electrode structure 26 and used for supplying air to the cathode electrode 36. A cooling-medium flow path 42 used for causing the cooling medium to flow is formed between the adjacent first and second separators 28 and 30.

The fuel cell stack 12 has a hydrogen-gas inlet 44*a*, a hydrogen-gas outlet 44*b*, an air inlet 46*a*, an air outlet 46*b*, a cooling-medium inlet 48*a*, and a cooling-medium outlet 48*b*. Among these, the hydrogen-gas inlet 44*a* extends through the fuel cell stack 12 in a stacking direction of the electric-power generation cells 24 and communicates with a supply side of the hydrogen-gas flow path 38. Similarly, the hydrogen-gas outlet 44*b* extends through the fuel cell stack 12 in the stacking direction of the electric-power generation cells 24 and communicates with a discharge side of the hydrogen-gas flow path 38. The hydrogen-gas flow path 38, the hydrogen-gas inlet 44*a*, and the hydrogen-gas outlet 44*b* form an anode flow path.

In contrast, the air inlet 46*a* extends through the fuel cell stack 12 in the stacking direction of the electric-power generation cells 24 and communicates with a supply side of the air flow path 40. The air outlet 46*b* extends through the fuel cell stack 12 in the stacking direction of the electric-power generation cells 24 and communicates with a discharge side of the air flow path 40. The air flow path 40, the air inlet 46*a*, and the air outlet 46*b* form a cathode flow path.

The cooling-medium inlet 48*a* extends through the fuel cell stack 12 in the stacking direction of the electric-power generation cells 24 and communicates with a supply side of the cooling-medium flow path 42. The cooling-medium outlet 48*b* extends through the fuel cell stack 12 in the stacking direction of the electric-power generation cells 24 and communicates with a discharge side of the cooling-medium flow path 42.

The fuel-gas supply device 14 includes a hydrogen tank 50 in which a high-pressure hydrogen gas is stored, and the hydrogen tank 50 is connected to the hydrogen-gas inlet 44*a* of the fuel cell stack 12 by a hydrogen-gas supply path 51 (fuel-gas supply flow path). The hydrogen-gas supply path 51 supplies the hydrogen gas to the fuel cell stack 12.

The hydrogen gas is stored in the hydrogen tank 50 while in a compressed state. That is to say, the hydrogen gas in the hydrogen tank 50 is under high pressure. Accordingly, a decompression system 52 is provided in the anode flow path in order to reduce the pressure of the hydrogen gas. Note that an electromagnetic on-off valve 53 and a tank internal pressure sensor 54 are provided on the upstream side of the decompression system 52. In other words, the hydrogen gas discharged from the hydrogen tank 50 will not be decompressed while flowing from the hydrogen tank 50 to the tank internal pressure sensor 54. Thus, the tank internal pressure sensor 54 detects the pressure of the hydrogen gas in the hydrogen tank 50 (tank internal pressure).

More specifically, the decompression system 52 includes a first regulator 55, a first pressure sensor 56, a second regulator 58, and a second pressure sensor 60 that are provided in the hydrogen-gas supply path 51. The first regulator 55 and the second regulator 58 are a first decompression mechanism and a second decompression mechanism, respectively, and the first pressure sensor 56 and the second pressure sensor 60 are a first-pressure detection unit and a second-pressure detection unit, respectively. The first regulator 55, the first pressure sensor 56, the second regulator 58, and the second pressure sensor 60 are arranged in this order from the upstream side toward the downstream side of the hydrogen-gas supply path 51 and electrically connected to the control unit 20.

The decompression system 52 further includes a bypass valve 64 (on-off valve) that is disposed at an intermediate portion of a hydrogen-side bypass flow path 62 (bypass flow path) that bypasses the second regulator 58. In other words, the hydrogen-side bypass flow path 62 branches off from the hydrogen-gas supply path 51 at a position on the downstream side of the first pressure sensor 56 and meets the hydrogen-gas supply path 51 at a position on the upstream side of the second pressure sensor 60.

The bypass valve 64 is brought into an opened state or a closed state by being controlled by the control unit 20. That is to say, the bypass valve 64 is operated so as to be opened and closed by the control unit 20. Obviously, when the bypass valve 64 is in the opened state, the hydrogen gas flows through the hydrogen-side bypass flow path 62. The second pressure sensor 60 detects the pressure of the hydrogen gas that passes through one of the second regulator 58 or the bypass valve 64 and that is introduced into the injector 65.

Supply of the hydrogen gas to the anode electrode 34 is performed and stopped by opening and closing the injector 65 (a drive valve). As is commonly known, an injector includes a valve therein, and the valve is brought into an opened state or a closed state. As the injector 65 is brought into the opened state, the hydrogen gas starts flowing through the anode flow path. In contrast, as the injector 65 is brought into the closed state, the flow of the hydrogen gas is stopped. The hydrogen gas discharged from the injector 65 flows into an ejector 66.

A hydrogen-gas discharge path 67 (an anode off-gas pipe) is connected to the hydrogen-gas outlet 44*b* of the fuel cell stack 12. A discharge-hydrogen gas (anode off-gas) that is the hydrogen gas at least a portion of which has been used by the anode electrode 34 is discharged from the fuel cell stack 12 through the hydrogen-gas discharge path 67.

A gas-liquid separator 68 is provided in the hydrogen-gas discharge path 67. A hydrogen circulation flow path 69 branches off from the hydrogen-gas discharge path 67 at a position downstream from the gas-liquid separator 68, and the downstream side of the hydrogen circulation flow path 69 is connected to the ejector 66. A hydrogen pump 70 is provided in the hydrogen circulation flow path 69. The hydrogen pump 70 circulates the anode off-gas, which is discharged to the hydrogen-gas discharge path 67, to the hydrogen-gas supply path 51 via the hydrogen circulation flow path 69 and the ejector 66, particularly when the hydrogen pump 70 is started up.

A first end of a purge flow path 71 communicates with the hydrogen-gas discharge path 67, and a purge valve 72 is disposed at an intermediate portion of the purge flow path 71. A first end of a drainage flow path 74 through which a fluid that contains, as a main component, a liquid is discharged is connected to the bottom of the gas-liquid separator 68. A drain valve 76 is disposed at an intermediate portion of the drainage flow path 74.

The oxidant-gas supply device 16 includes an air pump 78 that compresses and supplies an atmosphere (air), and the air pump 78 is provided in an air supply path (oxidant-gas supply flow path) 80. The air supply path 80 supplies the compressed air to the fuel cell stack 12.

The air supply path 80 is positioned downstream from the air pump 78 and connected to the air inlet 46a of the fuel cell stack 12, and a supply-side bypass valve (an inlet sealing valve) 82a and a humidifier 84 are interposed between the air supply path 80 and the air inlet 46a. A bypass supply path 86 that bypasses the humidifier 84 is connected to the air supply path 80. A bypass valve 88 is provided in the bypass supply path 86.

An air discharge path (a cathode off-gas discharge path) 90 is connected to the air outlet 46b of the fuel cell stack 12. A discharge compressed air (cathode off-gas) that is the compressed air at least a portion of which has been used by the cathode electrode 36 is discharged from the fuel cell stack 12 through the air discharge path 90.

The humidifier 84 is disposed on the downstream side of the air discharge path 90, and thus, the humidifier 84 performs moisture and heat exchange between the compressed air supplied by the air pump 78 and the cathode off-gas. In addition, in the air discharge path 90, a discharge-side bypass valve (outlet sealing valve) 82b and a back-pressure valve 92 are disposed on the downstream side of the humidifier 84. A second end of the purge flow path 71 and a second end of the drainage flow path 74 are connected to the downstream side of the air discharge path 90 such that the purge flow path 71 and the drainage flow path 74 meets the air discharge path 90, and as a result, a dilution unit is formed.

A first end of an air-side bypass flow path 94 is positioned on the upstream side of the supply-side bypass valve 82a and communicates with the air supply path 80. A second end of the air-side bypass flow path 94 is positioned on the downstream side of the discharge-side bypass valve 82b and on the downstream side of the back-pressure valve 92 and communicates with the air discharge path 90. A BP flow-rate adjusting valve 96, which adjusts the flow rate of the air flowing through the air-side bypass flow path 94, is provided in the air-side bypass flow path 94.

The cooling-medium supply device 18 includes a cooling-medium supply path 102 that is connected to the cooling-medium inlet 48a of the fuel cell stack 12, and a water pump 104 is disposed at an intermediate portion of the cooling-medium supply path 102. The cooling-medium supply path 102 is connected to a radiator 106, and a cooling-medium discharge path 108 that communicates with the cooling-medium outlet 48b is connected to the radiator 106.

A method of controlling the fuel cell system 10 according to the present embodiment will be described below using the relationship between the method and the operation of the fuel cell system 10.

The tank internal pressure is detected by the tank internal pressure sensor 54 disposed upstream from the first regulator 55. The pressure (first pressure) of the hydrogen gas between the first regulator 55 and the second regulator 58 is detected by the first pressure sensor 56. In contrast, the pressure (second pressure) of the hydrogen gas between the second regulator 58 and the injector 65 is detected by the second pressure sensor 60. The values of the tank internal pressure, the first pressure, and the second pressure are transmitted as information signals to the control unit 20. In other words, the tank internal pressure, the first pressure, and the second pressure are constantly being monitored by the control unit 20.

Figure 2:
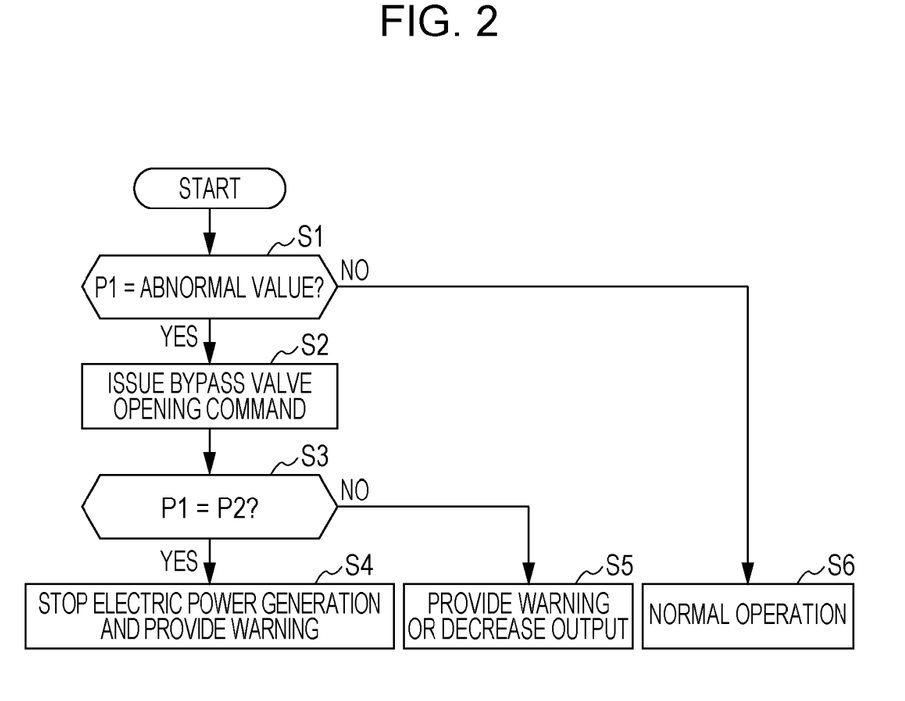
FIG. 2 is a flowchart schematically illustrating the method of controlling a fuel cell system according to the embodiment of the present disclosure.

For example, in the case where a fuel-cell vehicle has not been in operation for a long period of time, it is assumed that a value detected by the first pressure sensor 56 in an abnormal-value detection step S1 illustrated in FIG. 2 reaches a predetermined upper limit, that is, an abnormal value. Note that the predetermined upper limit is a value that exceeds a pressure range adjustable by the first regulator 55 (that is out of the pressure range adjustable by the first regulator 55) and may be equal to the pressure of the hydrogen gas in the hydrogen tank 50. In other words, in the case where the predetermined upper limit is equal to the pressure of the hydrogen gas in the hydrogen tank 50, the value (first pressure) detected by the first pressure sensor 56 and the value (tank internal pressure) detected by the tank internal pressure sensor 54 are equal to each other. Note that, in FIG. 2, the first pressure and the second pressure are respectively denoted by P1 and P2.

It is surmised that the reason the value detected by the first pressure sensor 56 has reached an abnormal value is that a small portion of the hydrogen gas has leaked from the first regulator 55 and thus has flowed to the downstream side of the first regulator 55 (this situation will hereinafter be referred to as a first cause) or an operation failure has occurred in the first pressure sensor 56 (this situation will hereinafter be referred to as a second cause). First, the control unit 20 determines whether the abnormal value has been detected due to the first cause or the second cause.

In other words, in a bypass-valve opening command step (on-off valve opening command step) S2, the control unit 20 produces an opening command signal for bringing the bypass valve 64 into the opened state. In addition, in a pressure-value comparison step S3, the control unit 20 compares the first pressure detected by the first pressure sensor 56 and transmitted as an information signal and the second pressure detected by the second pressure sensor 60 and transmitted as an information signal.

When the bypass valve 64 operates normally, the bypass valve 64 is in the opened state. Consequently, the hydrogen gas that has stayed between the first regulator 55 and the bypass valve 64 returns to the hydrogen-gas supply path 51 via the hydrogen-side bypass flow path 62 and the bypass valve 64. Thus, the first pressure decreases. When a certain period of time has passed after the bypass-valve opening command step S2 has been performed, the first pressure becomes equal to the second pressure.

In this case, the control unit 20 determines that the first pressure sensor 56 operates normally. That is to say, the control unit 20 determines that the first pressure has reached the abnormal value due to the first cause. In other words, the control unit 20 determines that the hydrogen gas has leaked from the first regulator 55.

In this case, a warning of the leakage of the hydrogen gas from the first regulator 55 is provided as represented by S4 in FIG. 2, and an operation for starting the operation of the fuel cell stack 12 is stopped. In the case where the above determination is performed during the period when the fuel cell stack 12 is operating, electric power generation is stopped. More specifically, the electromagnetic on-off valve 53 is closed, and accordingly, supply of the hydrogen gas to the fuel cell stack 12 is stopped. Therefore, an insufficient decompression of the hydrogen gas due to an operation failure of the first regulator 55 may be prevented.

In contrast, when the first pressure and the second pressure are not equal to each other, the control unit 20 determines that the first pressure has reached the abnormal value due to the second cause. In other words, the control unit 20 determines that an operation failure has occurred in the first pressure sensor 56. In this case, a warning of the operation failure of the first pressure sensor 56 is provided as illustrated represented by S5 in FIG. 2, and control for decreasing the output of the fuel cell stack 12 is performed. As a result, an appropriate amount of the hydrogen gas is supplied to the injector 65.

Note that, when the first pressure detected in the abnormal-value detection step S1 does not reach an abnormal value (when the first pressure is within the pressure range adjustable by the first regulator 55), the start-up of the fuel cell stack 12 or the electric power generation is continued as illustrated represented by S6 in FIG. 2.

In the case where the tank internal pressure is equal to or higher than a predetermined value and where the control unit 20 determines that an amount of the hydrogen gas sufficient to enable the fuel cell stack 12 to generate electricity is stored, the fuel cell stack 12 is started up, and the operation of the fuel-cell vehicle is started. In other words, the control unit 20 produces a command signal for opening the injector 65 in order to supply the hydrogen gas to the anode flow path from the fuel-gas supply device 14. As a result, the valve in the injector 65 is brought into the opened state, and thus, a predetermined amount of the hydrogen gas, which is supplied to the hydrogen-gas supply path 51 from the hydrogen tank 50, is supplied to the hydrogen-gas inlet 44a of the fuel cell stack 12 by passing through the injector 65 and the ejector 66.

In this case, both the first regulator 55 and the second regulator 58 are in the opened state, and in contrast, the bypass valve 64 is in the closed state. Thus, the hydrogen gas discharged from the hydrogen tank 50 passes through the first regulator 55 and the second regulator 58, and in this case, the hydrogen gas is decompressed to a predetermined pressure in a stepwise manner. In other words, first, the hydrogen gas is decompressed to a predetermined pressure value by the first regulator 55 and then is further decompressed to a low pressure value by the second regulator 58.

In addition, the hydrogen gas is introduced into the hydrogen-gas flow path 38 via the hydrogen-gas inlet 44a and flows along the hydrogen-gas flow path 38. As a result, the hydrogen gas is supplied to the anode electrode 34 of the electrolyte membrane/electrode structure 26.

Meanwhile, the control unit 20 produces a command signal for activating the air pump 78 in order to supply the compressed air from the oxidant-gas supply device 16. Along with this, the compressed air is sent to the air supply path 80 by the rotational operation of the air pump 78. The compressed air is humidified when passing through the humidifier 84 and then supplied to the air inlet 46a of the fuel cell stack 12. The compressed air is introduced into the air flow path 40 via the air inlet 46a and then supplied to the cathode electrode 36 of the electrolyte membrane/electrode structure 26 by flowing along the air flow path 40.

Accordingly, in the electrolyte membrane/electrode structure 26, the hydrogen gas supplied to the anode electrode 34 and oxygen included in the compressed air supplied to the cathode electrode 36 are consumed in an electrode catalyst layer by an electrochemical reaction, so that electricity is generated. A portion of the moisture supplied to the compressed air by the humidifier 84 penetrates into the solid polymer electrolyte membrane 32 via the cathode electrode 36 and reaches the anode electrode 34.

In the cooling-medium supply device 18, the cooling medium, such as pure water, ethylene glycol, or an oil, is supplied from the cooling-medium supply path 102 to the cooling-medium inlet 48a of the fuel cell stack 12 under the action of the water pump 104. The cooling medium flows along the cooling-medium flow path 42 and is discharged from the cooling-medium outlet 48b to the cooling-medium discharge path 108 after cooling the electric-power generation cells 24.

The hydrogen gas which has been supplied to the anode electrode 34 and a portion of which has been consumed is discharged as an anode off-gas from the hydrogen-gas outlet 44b to the hydrogen-gas discharge path 67. In this case, the anode off-gas entrains the moisture that has reached the anode electrode 34 in the manner described above. In other words, the anode off-gas that is introduced into the gas-liquid separator 68 is a moist gas containing moisture.

In the gas-liquid separator 68, a large portion of the moisture in the anode off-gas is separated from the anode off-gas. A liquid content (water) is discharged from the drainage flow path 74 as a result of the drain valve 76 being opened. In contrast, the anode off-gas, from which the moisture has been separated, is introduced, in a state of containing a small amount of residual mist, from the hydrogen-gas discharge path 67 into the hydrogen circulation flow path 69 under the action of the hydrogen pump 70. In addition, the anode off-gas is drawn into the ejector 66 from the hydrogen circulation flow path 69. Then, the anode off-gas meets a new hydrogen gas, which has passed through the first regulator 55, the second regulator 58, and the injector 65, and is supplied to the anode flow path from the hydrogen-gas supply path 51. As described above, the anode off-gas is supplied to the fuel cell stack 12 so as to circulate.

Note that the anode off-gas discharged to the hydrogen-gas discharge path 67 is discharged (purged) to the outside as necessary under the opening action of the purge valve 72.

Similarly, the compressed air which has been supplied to the cathode electrode 36 and a portion of which has been consumed is discharged as a cathode off-gas from the air outlet 46b to the air discharge path 90. The cathode off-gas passes through the humidifier 84 and humidifies new compressed air, which is supplied from the air supply path 80, and then discharged to the dilution unit by being adjusted by a set pressure of the back-pressure valve 92. Note that the cathode off-gas discharged to the air discharge path 90 is supplied from an air-circulation flow path 98 to the air supply path 80. In other words, also the cathode off-gas is supplied to the fuel cell stack 12 so as to circulate.

As described above, when it is determined that the first pressure and the second pressure are not equal to each other in the pressure-value comparison step S3, control for decreasing the output of the fuel cell stack 12 is performed. Thus, the fuel cell stack 12 generates electricity within its output range.

Figure 3:
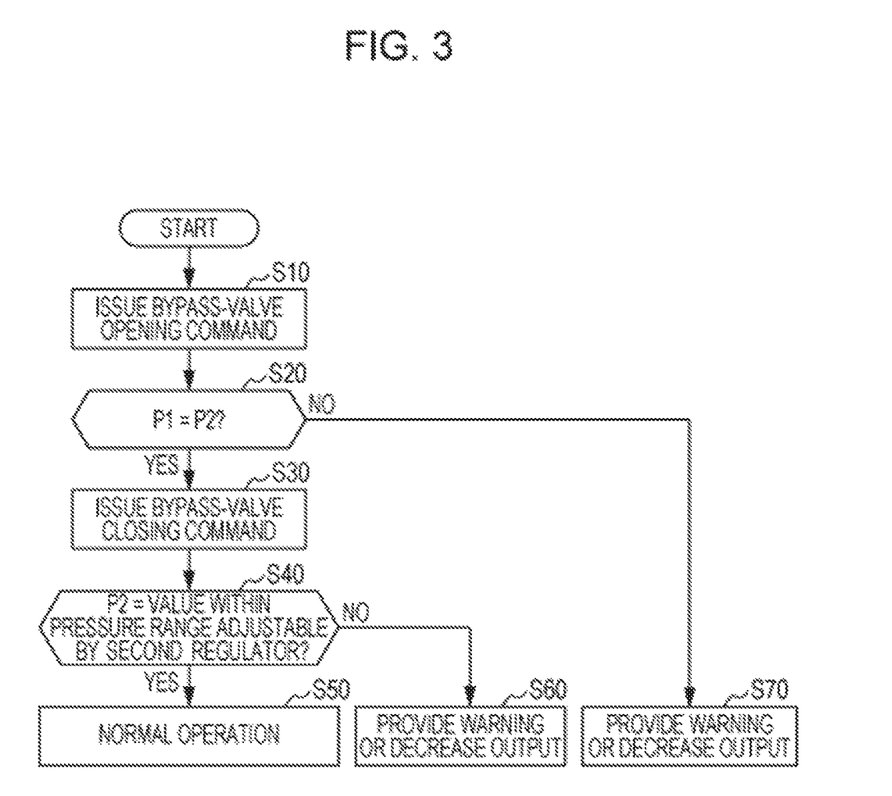
FIG. 3 is a flowchart schematically illustrating a method of controlling a fuel cell system according to another embodiment of the present disclosure.

During the period when the fuel cell stack 12 is operating, the control unit 20 performs control illustrated in FIG. 3 in order to determine whether the decompression system 52 operates normally. In other words, the control unit 20 produces a command signal for bringing the bypass valve 64 into the opened state at any timing and performs a bypass-valve opening command step (on-off valve opening command step) S10.

When the bypass-valve opening command step S10 is performed, the injector 65 generates an operating sound. During the period when the fuel-cell vehicle is running, the operating sound is blocked by the running sound of the fuel-cell vehicle. In contrast, for example, the operating sound is generated when the fuel-cell vehicle is not in operation and is in an idling state (when the output of the fuel cell stack 12 is equal to or lower than a predetermined threshold), the operating sound may sometimes be recognized as noise by a user. In order to suppress this situation from occurring, during the period when the fuel-cell vehicle is idling, it is preferable that the bypass-valve opening command step S10 be performed during the period when a sound is generated as a result of the car air conditioner 21, the car audio system 22, or the like being used.

Note that the situation in which the car air conditioner 21, the car audio system 22, or the like is used is transmitted as information to the control unit 20. Consequently, the control unit 20 is capable of performing the bypass-valve opening command step S10 in accordance with the timing at which the car air conditioner 21, the car audio system 22, or the like is used.

When the bypass valve 64 operates normally, the bypass valve 64 is in the opened state. In this case, when a certain period of time has passed after the bypass-valve opening command step S10 has been performed, the second pressure increases and becomes equal to the first pressure. The control unit 20 compares the first pressure and the second pressure when a certain time has passed after the bypass-valve opening command step S10 has been performed (pressure-value comparison step S20).

In the case where it is determined that the first pressure is within a pressure range that may be reduced by the first regulator 55 and is equal to the second pressure in the pressure-value comparison step S20, the control unit 20 determines that the first regulator 55 operates normally.

Figure 4:
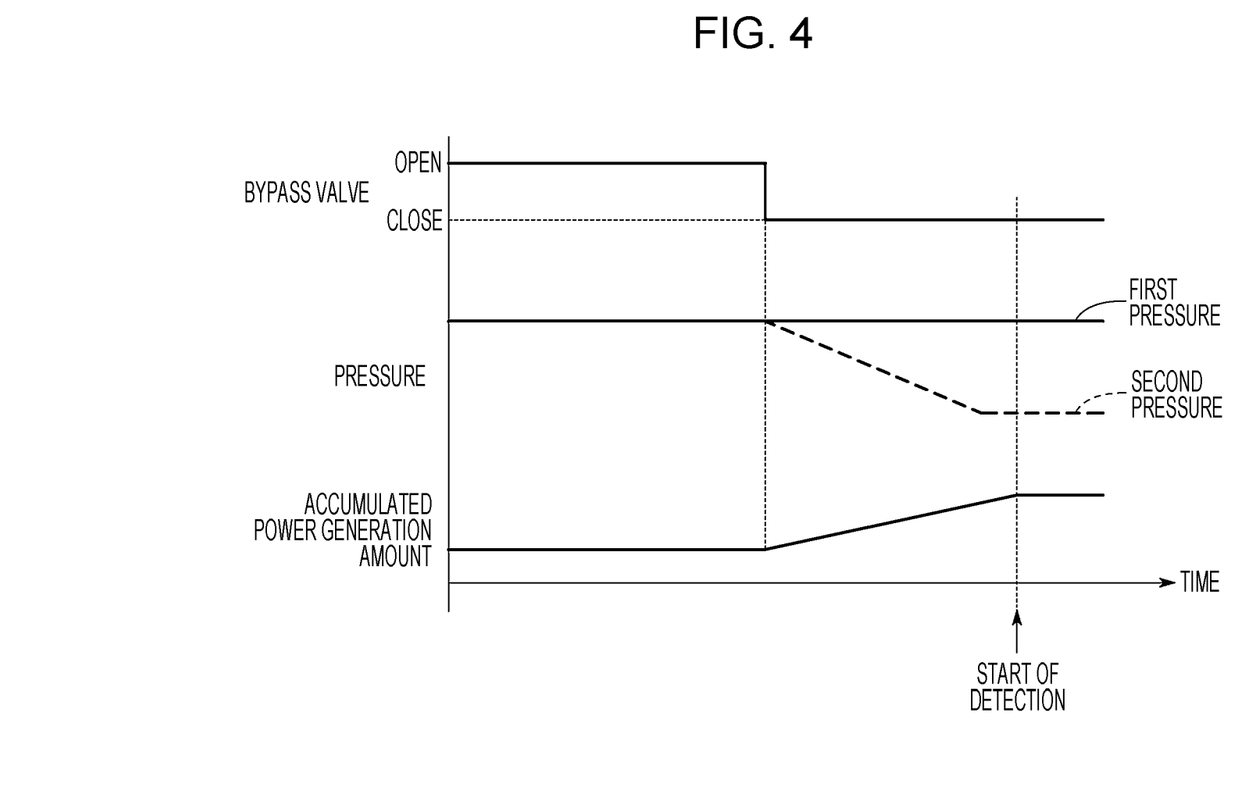
FIG. 4 is a graph schematically illustrating changes in values of first and second pressures with time along with opening and closing of a bypass valve, which is an on-off valve.

Next, the control unit 20 performs a bypass-valve closing command step (on-off valve closing command step) S30 for bringing the bypass valve 64 into the closed state and then detects the second pressure. Here, immediately after the bypass-valve closing command step S30 has been performed, as illustrated in FIG. 4, the second pressure gradually changes depending on the amount of the hydrogen gas consumed for electric power generation. Accordingly, the control unit 20 defers a determination based on the detection result of the second pressure until a certain period of time passes after the bypass-valve closing command step S30 has been performed or until the accumulated power generation amount of the fuel cell reaches a predetermined value.

When a certain period of time has passed after the bypass-valve closing command step S30 has been performed or when the accumulated power generation amount of the fuel cell has reached the predetermined value, the control unit 20 detects the second pressure at that time. In other words, a second-pressure detection step S40 is performed. In this case, when the second pressure does not reach a predetermined upper limit (when the second pressure is within a pressure range adjustable by the second regulator 58), the control unit 20 determines that the bypass valve 64 operates normally.

In this case, as represented by S50 in FIG. 3, the control unit 20 maintains the output of the fuel cell stack 12. In this case, the first regulator 55, the second regulator 58, and the bypass valve 64 operate normally, and the hydrogen gas is actually decompressed to a predetermined pressure in a stepwise manner. Thus, there will be no particular problem even if the output of the fuel cell stack 12 is maintained.

In contrast, when the second pressure reaches the predetermined upper limit, for example, the control unit 20 determines that the bypass valve 64 is still in the opened state even though the bypass-valve closing command step S30 has been performed or that a sufficient decompression has not been performed because an operation failure has occurred in the second regulator 58. In this case, the control unit 20 provides a warning and decreases the output of the fuel cell stack 12 as represented by S60.

In contrast, when the first pressure and the second pressure are not equal to each other (are different values) in the pressure-value comparison step S20, the control unit 20 determines that the bypass valve 64 is not in the opened state due to an operation failure or that the second pressure sensor 60 does not detect an accurate value due to an operation failure. When the second pressure is out of the pressure range adjustable by the first regulator 55, the control unit 20 determines that a sufficient decompression has not been performed because an operation failure has occurred in the first regulator 55.

In any of these cases, the control unit 20 provides a warning and decreases the output of the fuel cell stack 12 as represented by S70 in FIG. 3. Note that, in order to decrease the output of the fuel cell stack 12, for example, the amounts of the hydrogen gas and the compressed air supplied to the fuel cell stack 12 may be reduced.

As described above, according to the present embodiment, the unit in which an operation failure has occurred is determined by performing the predetermined steps. On the basis of the results obtained through the predetermined steps, it is determined whether to maintain or limit the output of the fuel cell stack 12. Consequently, the output is prevented from being unnecessarily limited, which in turn results in an improvement in user convenience.

The present disclosure is not particularly limited to the above embodiments, and various changes may be made within the gist of the present disclosure.

For example, during the period when the fuel-cell vehicle is running, it is not particularly necessary to perform the bypass-valve closing command step S30 in accordance with the timing at which the car air conditioner 21 or the car audio system 22 is used.

A method of controlling a fuel cell system that includes a fuel cell that generates electricity by an electrochemical reaction using a fuel gas, which is supplied to an anode electrode via a fuel-gas supply flow path, and an oxidant gas, which is supplied to a cathode electrode via an oxidant-gas supply flow path, a fuel-gas storage container in which the fuel gas is stored, a first decompression mechanism that is provided in the fuel-gas supply flow path and used for reducing a pressure of the fuel gas, a second decompression mechanism that is provided in the fuel-gas supply flow path so as to be positioned downstream from the first decompression mechanism and used for reducing the pressure of the fuel gas, a bypass flow path that branches off from the fuel-gas supply flow path so as to bypass the second decompression mechanism, an on-off valve that is provided in the bypass flow path, a drive valve that is provided in the fuel-gas supply flow path so as to be positioned downstream from the second decompression mechanism and the bypass flow path, a first pressure detection unit that is disposed between the first decompression mechanism and the second decompression mechanism and that detects a first pressure on a downstream side of the first decompression mechanism, and a second pressure detection unit that is disposed between the second decompression mechanism and the drive valve and that detects a second pressure on a downstream side of the second decompression mechanism, the method according to the present disclosure includes an on-off valve opening command step in which an opening command for bringing the on-off valve into an opened state is issued and a pressure-value comparison step in which the first pressure and the second pressure are compared with each other when a certain period of time has passed after the opening command has been issued. When the first pressure and the second pressure are not equal to each other in the pressure-value comparison step, control for decreasing an output of the fuel cell or control for stopping electric power generation is performed.

In other words, when the first pressure and the second pressure are not equal to each other, for example, a control unit that controls the fuel cell determines that an operation failure has occurred in one of the second-pressure detection unit and the on-off valve and limits the output of the fuel cell or performs control for stopping electric power generation. Therefore, an excessive amount of a high-pressure hydrogen gas may be prevented from being supplied to the fuel cell.

Note that the control for stopping electric power generation is, for example, control for stopping supply of the hydrogen gas. More specifically, a valve that is disposed downstream the fuel cell in the fuel-gas supply flow path is closed.

During the period when the fuel cell is generating electricity, even if the command for bringing the on-off valve into the opened state is issued, the response speed of the second pressure is relatively slow. Thus, it is assumed that the second pressure gradually changes from a value within a pressure range adjustable by the first decompression mechanism to a value out of the pressure range. Accordingly, particularly during the period when the fuel cell is generating electricity, when a certain period of time has passed after an on-off valve opening command has been issued, it is preferable that the control for decreasing the output of the fuel cell be performed in the case where the second pressure is out of the pressure range adjustable by the first decompression mechanism in the pressure-value comparison step.

The on-off valve opening command step may be performed at any timing during the period when the fuel cell is operating or may be performed when the first pressure reaches a predetermined upper limit. By performing the on-off valve opening command step when the first pressure reaches the predetermined upper limit, it may be easily determined whether leakage has occurred in the first decompression mechanism particularly when the fuel cell system is started up.

It is preferable that an on-off valve closing command step, in which the on-off valve is brought into a closed state when the first pressure and the second pressure are equal to each other in the pressure-value comparison step, and a second-pressure detection step, in which the second pressure is detected when a certain period of time has passed after the on-off valve has been brought to the closed state or when the accumulated power generation amount of the fuel cell reaches a predetermined value, be performed.

In the second-pressure detection step, when the first pressure is within the pressure range adjustable by the first decompression mechanism, and the second pressure is out of a pressure range adjustable by the second decompression mechanism, the control unit determines that an operation failure has occurred in the second decompression mechanism, the on-off valve, or the like. Therefore, in this case, the control for decreasing the output of the fuel cell is performed.

In contrast, in the second-pressure detection step, when the second pressure is within the pressure range adjustable by the second decompression mechanism (when the second pressure has not yet reached a predetermined upper limit), the control unit determines that a unit operates normally. In this case, the fuel gas is sufficiently decompressed, and thus, there will be no particular problem even if the output of the fuel cell is maintained. Therefore, in this case, control for maintaining the output of the fuel cell is performed.

By performing the above controls, when it is determined that an operation failure has occurred in one of the first pressure detection unit and the second pressure detection unit, the output of the fuel cell may be prevented from being unnecessarily limited. This results in an improvement in user convenience.

For example, in the case where the fuel cell is mounted on a vehicle body of an automobile, when the vehicle is idling and the load on the fuel cell is low, that is, when the output of the fuel cell is equal to or lower than a predetermined threshold, there is a possibility that an operating sound will be recognized as noise by a user when closing the drive valve. In order to suppress this situation from occurring, it is preferable that a sound generation mechanism be mounted on the vehicle body of the automobile, and in the above case, it is preferable that the on-off valve opening command step be performed during the period when the sound generation mechanism is generating a sound. The sound generated by the sound generation mechanism blocks the operating sound, and thus, the user is prevented from experiencing an uncomfortable feeling due to the operating sound.

Note that preferred examples of the sound generation mechanism include a vehicle air-conditioning apparatus (a car air conditioner) and a vehicle audio system.

According to the present disclosure, a unit that is included in a decompression system and in which an operation failure has occurred is determined, and the output of a fuel cell is maintained when it is determined that a fuel gas is decompressed, whereas the output of the fuel cell is limited or electric power generation is stopped when it is determined that an operation failure has occurred in a decompression mechanism or an on-off valve. In other words, when it is not necessary to limit the output, control for limiting the output will not be performed. This results in an improvement in user convenience.

Obviously, numerous modifications and variations of the present invention are possible in light of the above teachings. It is therefore to be understood that within the scope of the appended claims, the invention may be practiced otherwise than as specifically described herein.

What is claimed is:

1. A method of controlling a fuel cell system that includes a fuel cell, comprising:

supplying an oxidant gas to a cathode electrode of the fuel cell;

supplying a fuel gas from a fuel-gas storage container to an anode electrode of the fuel cell via a drive valve provided in a fuel-gas path to generate electric power in the fuel cell via an electrochemical reaction between the fuel gas and the oxidant gas;

detecting a first pressure in the fuel-gas path between a first decompression mechanism and a second decompression mechanism, the first decompression mechanism being provided in the fuel-gas path between the drive valve and the fuel-gas storage container, the second decompression mechanism being provided in the fuel-gas path between the first decompression mechanism and the drive valve;

detecting a second pressure in the fuel-gas path between the second decompression mechanism and the drive valve;

opening an on-off valve provided in a bypass path that bypasses the second decompression mechanism;

comparing the first pressure and the second pressure after the on-off valve has been opened; and controlling the fuel cell system to decrease the electric power generated by the fuel cell as the first pressure is not substantially equal to the second pressure and to stop generating the electric power in the fuel cell as the first pressure is substantially equal to the second pressure.

2. The method according to claim 1, wherein the on-off valve is opened as the first pressure reaches an upper limit.

3. The method according to claim 1, wherein the first pressure and the second pressure are compared as a certain period of time has passed after the on-off valve has been opened.

4. The method according to claim 1, wherein as the fuel cell system is controlled to stop generating the electric power in the fuel cell, the drive valve that is disposed downstream the fuel-gas storage container in the fuel-gas path is closed, and supply of the fuel-gas to the fuel cell is stopped.

5. The method according to claim 1, wherein during generating of the electric power by the fuel cell, the fuel cell system is controlled to decrease the electric power generated by the fuel cell as the second pressure is out of a pressure range adjustable by the first decompression mechanism.

6. The method according to claim 1, wherein the fuel cell is mounted on a vehicle body together with a sound generation mechanism, and as an output of the fuel cell is equal to or lower than a threshold, the on-off valve is opened during a period as the sound generation mechanism is generating a sound.

7. The method according to claim 1, further comprising:

closing the on-off valve as the first pressure is substantially equal to the second pressure; and detecting the second pressure after the on-off valve has been closed or as an accumulated power generation amount of the fuel cell reaches a value, wherein as the first pressure is within a pressure range adjustable by the first decompression mechanism, and the second pressure is out of a pressure range adjustable by the second decompression mechanism, the fuel cell system is controlled to decrease the electric power or to stop generating the electric power.

8. The method according to claim 7, wherein the second pressure is detected as a certain period of time has passed after the on-off valve has been closed or as the accumulated power generation amount of the fuel cell reaches the value.

* * * * *